United States Patent
Kuhar et al.

(10) Patent No.: US 11,619,796 B2
(45) Date of Patent: Apr. 4, 2023

(54) RIBBED AND GROOVED CABLE HAVING EMBEDDED STRENGTH MEMBER WITH WATER BLOCKING COATING

(71) Applicant: Sterlite Technologies Limited, Gurgaon (IN)

(72) Inventors: Sharun Kuhar, Gurgaon (IN); Vikash Shukla, Gurgaon (IN); Swapnil Sharma, Gurgaon (IN); Kishore Sahoo, Gurgaon (IN)

(73) Assignee: Sterlite Technologies Limited, Harayana (IN)

( * ) Notice: Subject to any disclaimer, the term of this patent is extended or adjusted under 35 U.S.C. 154(b) by 0 days.

(21) Appl. No.: 17/347,080

(22) Filed: Jun. 14, 2021

(65) Prior Publication Data

US 2021/0389542 A1 Dec. 16, 2021

(30) Foreign Application Priority Data

Oct. 22, 2020 (IN) .............................. 202011045978

(51) Int. Cl.
*G02B 6/44* (2006.01)
(52) U.S. Cl.
CPC .................. *G02B 6/4494* (2013.01)
(58) Field of Classification Search
None
See application file for complete search history.

(56) References Cited

U.S. PATENT DOCUMENTS

| | | | | |
|---|---|---|---|---|
| 6,573,456 B2 * | 6/2003 | Spruell | .................. | H01B 7/185 156/48 |
| 6,639,152 B2 * | 10/2003 | Glew | .................... | H01B 11/06 174/113 C |
| 2008/0056650 A1 * | 3/2008 | Stingl | .................. | G02B 6/4433 385/100 |
| 2014/0119699 A1 * | 5/2014 | Keller | .................... | G02B 6/443 385/102 |

* cited by examiner

*Primary Examiner* — Jerry Rahll
(74) *Attorney, Agent, or Firm* — Steven R. Fairchild; Michael J. Pennington (57) ABSTRACT

A ribbed and grooved fiber cable (100) includes a core with a plurality of optical fibers, a sheath (102) enveloping the core and one or more strength members (108) embedded in the sheath (102). The strength members (108) are coated with a water blocking coating material having at least one of an ultraviolet (UV) curable water swellable resin composition and a layer of ethylene acrylic acid (EAA). Particularly, the water blocking coating material applied over the strength members (108) has a thickness of 50±10 microns. The sheath (102) of the cable (100) has at least one of a plurality of ribs (104) and grooves (106) on an external surface of the sheath (102), and a plurality of ribs (104a) and grooves (106a) on an internal surface of the sheath (102). The plurality of ribs (104) have variable height.

20 Claims, 10 Drawing Sheets

RIBBED AND GROOVED CABLE HAVING EMBEDDED STRENGTH MEMBER WITH WATER BLOCKING COATING

CROSS-REFERENCE TO RELATED APPLICATIONS

This application claims the benefit of Indian Application No. 202011024930 "Ribbed and Grooved Cable" filed by the applicant on Jun. 13, 2020 and an Indian Application Number 202011045978 filed by the applicant on Oct. 22, 2020, both of which are incorporated herein by reference in their entirety.

FIELD OF THE INVENTION

Embodiments of the present invention relate to a field optical communication technology. And more particularly, relates to a ribbed and grooved optical cable.

DESCRIPTION OF THE RELATED ART

With technological and scientific advancements, various modern communication technologies have been introduced and employed. One of the most important modern communication technologies is optical fiber communication technology using a variety of optical fiber cables. The optical fiber cables are widely used for communication to meet the increasing demands of end-users. To meet the increasing demands, installation of the optical fiber cables at a rapid pace becomes essential. The optical fiber cables for telecommunication application are installed in ducts. The installation of the optical fiber cables in the ducts is mostly performed using a blowing method, wherein, the blowing method to install the optical fiber cables in the ducts is dependent on a plurality of factors. The plurality of factors includes mass of the optical fiber cable, friction, stiffness, and the like. The blowing method enables installation of the optical fiber cable using pressurized air combined with additional mechanical pushing force that is called as "blowing".

In general, the blowing method is the process of installation of the optical fiber cable into a pre-installed duct. The blowing is performed by injecting pressurized air inlet of the pre-installed duct before the optical fiber cable is pushed into the pre-installed duct. The pressurized air flows at high speed through the pre-installed duct and along the optical fiber cable. Also, pushing force is applied near the optical fiber cable inlet by a pushing device. The optical fiber cable includes uni-tube, multi-tube, unarmoured, armoured, micro duct cable, and the like. However, conventional structure of optical fiber cable makes it inefficient to allow pressurized air to blow the optical fiber cable in the pre-installed duct. In addition, the conventional optical fiber cable resists the pushing force due to higher coefficient of friction. Further, the conventional optical fiber cable has a higher number of contact points with the pre-installed duct. Furthermore, the conventional optical fiber cable has heavy weight.

Additionally, strength members are one of the important components of the optical fiber cable. The purpose of the strength members is to provide the optical fiber cable rigidity, bend resistance, mechanical strength and ease in blowing. A strength member can be installed either at a center of the optical fiber cable or embedded inside the sheath of the optical fiber cable. The strength member embedded inside the sheath is normally preferred over a central strength member for making a high density optical fiber cable as there is more space available in the center. After embedding the strength member in the sheath of the optical fiber cable, often water penetration occurs through the embedded strength member. The main reason is, during the embedding of the strength member inside the sheath, some clearance remains between the strength member and the sheath due to manufacturing tolerances. Generally, the water may penetrate even through a clearance of a few dozen microns. A water penetration test of the optical fiber cable is often carried out to assess the ability of the optical fiber cable to resist the water penetration in the optical fiber cable. Such water penetration assessments are necessary because water once penetrated through the clearance between the strength member and the sheath due to manufacturing tolerances, may travel to optical fiber junction boxes and may degrade optical properties of the components such as optical fibers. Also, water penetration through a length of the optical fiber cable further leads to degradation of other components of the optical network.

A prior-art reference "W02020075734A1" discloses an optical fiber cable having a plurality of ribs on the surface of the optical fiber cable for improved blowing performance, however the ribs are of the same height.

In view of the aforementioned discussion and prior-art reference, there exists a need for an optical fiber cable that overcomes the above cited disadvantages of the conventional optical fiber cable. Hence, the present invention focuses on a ribbed and grooved cable having embedded strength members with water blocking coating. Any references to methods, apparatus or documents of the prior art are not to be taken as constituting any evidence or admission that they formed, or form part of the common general knowledge.

SUMMARY OF THE INVENTION

An embodiment of the present invention relates to a ribbed grooved optical fiber cable includes a core with a plurality of optical fibers, a sheath enveloping the core and the sheath has an outer surface and an inner surface, the outer surface of the sheath has a plurality of external ribs and a plurality of external grooves and one or more strength members embedded in the sheath. In particular, the one or more strength members are coated with a water blocking coating material having at least one of an ultraviolet (UV) curable water swellable resin composition and a layer of ethylene acrylic acid (EAA).

In accordance with an embodiment of the present invention, the UV curable water swellable resin composition includes acrylic acid, phenyl bis(2,4,6-trimethylbenzoyl)-phosphine oxide and oxybis(methyl-2,1-ethanediyl) diacrylate. In accordance with an embodiment of the present invention, the UV curable water swellable resin composition is applied directly on the one or more strength members or above a thin layer of ethylene acrylic acid (EAA). In accordance with an embodiment of the present invention, the UV curable water swellable resin composition coated one or more strength members are passed through one or more UV chambers to cure the UV curable water swellable resin composition In accordance with an embodiment of the present invention, the water blocking coating material applied over the one or more strength members has a thickness of 50±10 microns.

In accordance with an embodiment of the present invention, the one or more strength members are made of a fiber reinforced plastic (FRP), an aramid reinforced plastic (ARP) or alike material. In accordance with an embodiment of the present invention, the plurality of external ribs are arranged alternately throughout the outer surface of the sheath of the ribbed grooved optical fiber cable. In accordance with an embodiment of the present invention, the plurality of external ribs having the first height and the second height are arranged in such a way that the plurality of external ribs having the first height and the plurality of external ribs having the second height are positioned diagonally opposite to each other. In accordance with an embodiment of the present invention, the plurality of external ribs of the sheath have at least two heights including a first height and a second height. In accordance with an embodiment of the present invention, the first height is in a range of 0.2 millimeters to 1.0 millimeters and the second height is in the range of 0.1 millimeters to 0.5 millimeters. In accordance with an embodiment of the present invention, the plurality of external ribs and the plurality of external grooves has a width in the range of 1.2 millimeters to 2.5 millimeters. In accordance with an embodiment of the present invention, the shape of the plurality of external ribs and the plurality of external grooves is any rectangular shape with rounded edges, a pointy triangle shape, a circular shape, a curve-type shape or any suitable shape. In accordance with an embodiment of the present invention, the sheath and the plurality of external ribs are made of a same material. In accordance with an embodiment of the present invention, the sheath and the plurality of external ribs are made of different materials. In accordance with an embodiment of the present invention, the ribbed grooved optical fiber cable has a diameter in the range of 11 to 13 millimeters and has a blowing of more than 1100 meters in a duct with an inner diameter of 14 millimeters and an outer diameter of 18 millimeters. In accordance with an embodiment of the present invention, the plurality of internal ribs and the plurality of internal grooves are arranged alternately throughout the inner surface of the sheath. In accordance with an embodiment of the present invention, the plurality of internal grooves is made to reduce weight of the ribbed grooved optical fiber cable. In accordance with an embodiment of the present invention, a shape of the plurality of internal ribs and the plurality of internal grooves has a rectangular shape with rounded edges, a pointy triangle shape, a circular shape, a curve-type shape or alike shape. In accordance with an embodiment of the present invention, the plurality of internal ribs has a height in a range of 0.1 millimeter to 1.0 millimeter. In accordance with an embodiment of the present invention, the plurality of internal ribs and the plurality of internal grooves has a width in the range of 1.2 millimeter to 2.5 millimeters.

In accordance with an embodiment of the present invention, the sheath used in the ribbed grooved optical fiber cable passes a water penetration test at 0.1 bar pressure water-head applied to a 3 meter optical cable for at least 24 hours. The foregoing objectives of the present invention are attained by employing a ribbed grooved optical fiber cable with embedded strength members coated with a water blocking coating material.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Ribbed Grooved Optical Fiber Cable 100
Sheath 102
Plurality Of Ribs 104
Plurality Of Grooves 106
Plurality Of Internal Ribs 104a
Plurality Of Internal Grooves 106a
Plurality Of Coated Strength Members 108
Coating 202
Cable Sample 302
Watertight Seal 304
Water-head 306

The ribbed and grooved cable and the sheath illustrated in the accompanying drawings, throughout which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

The principles of the present invention and their advantages are best understood by referring to FIG. 1 to FIG. 10.

In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items. Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Figure 1:
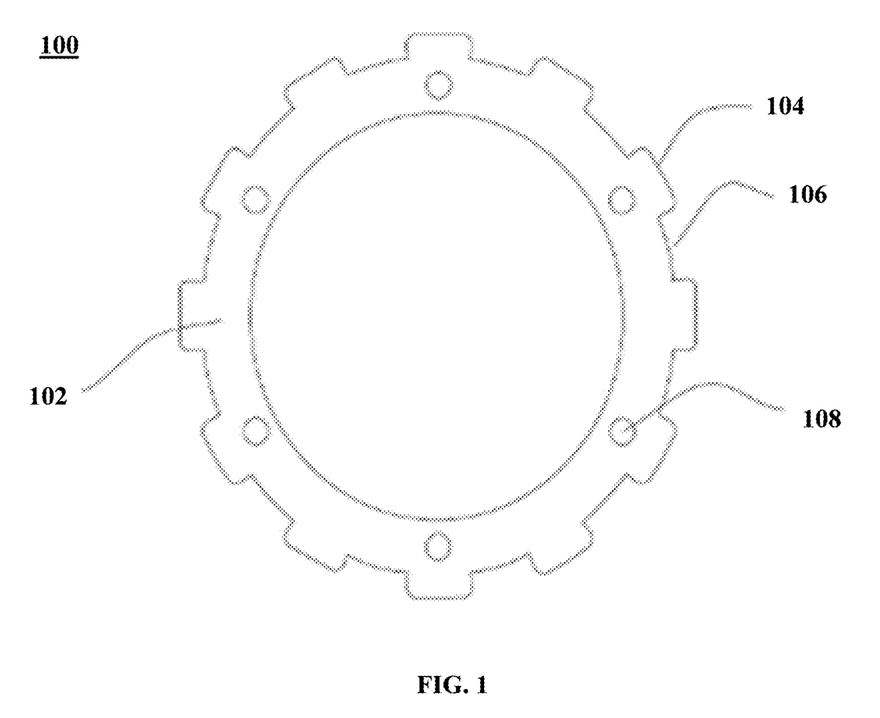
FIG. 1 illustrates a sheath of a ribbed grooved optical fiber cable having a plurality of ribs and a plurality of grooves on an external surface of the sheath and strength members embedded inside the sheath in accordance with a first configuration of the present invention.

FIG. 1 illustrates a design of a sheath of an optical ribbed and grooved 100 having a plurality of ribs and a plurality of grooves on an external surface of the sheath and strength members embedded inside the sheath in accordance with the first configuration of the present invention. In particular, the cable is termed as a ribbed and grooved optical fiber cable 100 as it has a ribbed and grooved sheath. Moreover, the ribbed and grooved optical fiber cable 100 includes a plurality of optical fibers (not shown) and the sheath 102 having a plurality of ribs 104 and a plurality of grooves 106. Moreover, the sheath 102 has a plurality of strength members 108 embedded into it.

The sheath 102 includes an inner surface and an outer surface. In particular, sheath is an outer layer of a ribbed grooved optical fiber cable 100 protects the optical fiber cable from environmental conditions. In addition, the environment conditions include but may not be limited to rainfall, sunlight, snowfall, and wind. Moreover, the sheath 102 of the ribbed and grooved optical fiber cable 100 encloses the plurality of optical fibers concentrically along a length of the optical fiber cable. Further, the sheath has an outer surface and an inner surface. The outer surface of the sheath 102 of the ribbed and grooved optical fiber cable 100 includes the plurality of ribs 104 and the plurality of grooves 106. The plurality of ribs 104 and the plurality of grooves 106 are formed on the outer surface of the sheath 102, thus called as a plurality of external ribs and a plurality of external grooves throughout the invention.

In an embodiment of the present invention, the number of the plurality of ribs 104 is the same as the number of the plurality of grooves 106. In one embodiment of the present invention, each of the plurality of ribs 104 has depth in range of about 0.1 millimeter to 2 millimeters. In another embodiment of the present invention, the plurality of ribs 104 has depth in range of about 0.2 millimeter to 1 millimeter. In yet another embodiment of the present invention, depth of the plurality of ribs 104 may vary. In an embodiment of the present invention, the plurality of ribs 104 has width in range of about 0.4 millimeter to 20 millimeter. In another embodiment of the present invention, the plurality of ribs 104 has width in range of about 0.5 millimeter to 4 millimeter. In yet another embodiment of the present invention, width of the plurality of ribs 104 may vary. In one aspect of the present invention, the plurality of ribs 104 may be 12.

In another aspect of the present invention, the plurality of ribs 104 may vary depending upon the width of the plurality of ribs 104. In an embodiment of the present invention, the number of grooves 106 is 12. In another embodiment of the present invention, the plurality of grooves 106 may vary depending upon width of the plurality of grooves 106.

In one aspect of the present invention, the area of the ribbed and grooved optical fiber cable 100 corresponding to 12 ribs and 12 grooves is about 44.45 millimeter square. In another aspect of the present invention, the area of the cable may vary depending upon internal diameter of the cable, external diameter of the cable, number of the plurality of ribs 104 and the plurality of grooves 106. In an aspect of the present invention, the ribbed and grooved optical fiber cable 100 has deformation of about 0.59 under crushing load at 500 Newton per 100 millimeter. In another aspect of the present invention, the deformation of the ribbed and grooved optical fiber cable 100 may vary. In particular, deformation of the ribbed and grooved optical fiber cable 100 may vary depending upon a plurality of parameters. And, the plurality of parameters includes but may not be limited to number of the plurality of ribs 104 and the plurality of grooves 106, width and height of the plurality of ribs 104 and the plurality of grooves 106, inside and outside diameter of the ribbed and grooved optical fiber cable 100, number of the plurality of strength members 108 in the sheath 102, and material grade of the ribbed and grooved optical fiber cable 100.

The plurality of ribs 104 and the plurality of grooves 106 reduce coefficient of friction between the sheath 102 and a duct. In an embodiment of the present invention, the plurality of ribs 104 and the plurality of grooves 106 are arranged alternately to each other on the outer surface of the sheath 102. In an exemplary example, a groove of the plurality of grooves 106 is present on both sides of each rib of the plurality of ribs 104. In another exemplary example, a rib of the plurality of ribs 104 is present on both sides of each groove of the plurality of grooves 106. In an embodiment of the present invention, the height of each of the plurality of ribs 104 is equal. Alternatively, in another embodiment, height of each of the plurality of grooves 106 is equal.

In an embodiment of the present invention, the ribbed and grooved optical fiber cable 100 is installed into the duct using a blowing process. Particularly, the duct surrounds the ribbed and grooved optical fiber cable 100. The blowing process to install the ribbed and grooved optical fiber cable 100 in the duct is dependent on a plurality of factors. Moreover, the plurality of factors includes mass of the ribbed and grooved optical fiber cable 100, friction between the ribbed and grooved optical fiber cable 100 and the duct, stiffness of the ribbed and grooved optical fiber cable 100, and the like. Also, the blowing process enables installation of the ribbed and grooved optical fiber cable 100 using pressurized air combined with a mechanical pushing force. Further, the ribbed and grooved optical fiber cable 100 includes the plurality of strength members 108. Furthermore, each of the plurality of strength members 108 is embedded in the sheath 102.

In an embodiment of the present invention, each of the plurality of strength elements 108 in the sheath 102 may be positioned differently. Particularly, the plurality of strength members 108 enhances blowing performance of the ribbed and grooved optical fiber cable 100 by increasing stiffness of the ribbed and grooved optical fiber cable 100. Moreover, the plurality of strength members 108 provides tensile strength to the ribbed and grooved optical fiber cable 100.

In an embodiment of the present invention, the plurality of strength members 108 embedded in the sheath 102 of the ribbed and grooved optical fiber cable 100 is in the range of 4 to 18. In another embodiment of the present invention, the number of the plurality of strength members 108 may vary.

Figure 2:
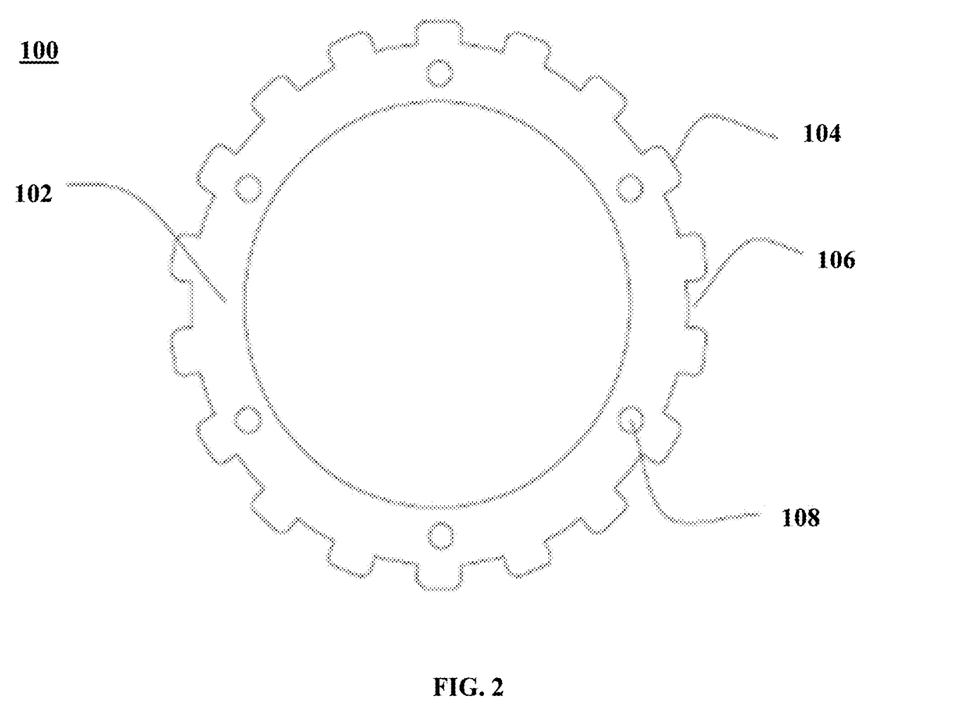
FIG. 2 illustrates the sheath having the plurality of ribs and the plurality of grooves on the external surface of the sheath and strength members embedded inside the sheath in accordance with a second configuration of the present invention.

FIG. 2 illustrates the sheath having the plurality of ribs and the plurality of grooves on the external surface of the sheath and strength members embedded inside the sheath in accordance with a second configuration of the present invention. The plurality of ribs 104 in the sheath 102 is 18. Alternatively, the plurality of ribs 104 in the sheath 102 may vary.

In an embodiment of the present invention, the plurality of grooves 106 in the sheath 102 is 18. Alternatively, the plurality of grooves 106 may vary. In an embodiment of the present invention, the area of the ribbed and grooved optical fiber cable 100 corresponding to 18 ribs and 18 grooves is about 44.28 millimeter square. In particular, area of the cable may vary depending upon internal diameter of the cable, external diameter of the cable, number of the plurality of ribs 104 and the plurality of grooves 106.

The ribbed and grooved optical fiber cable 100 has deformation of about 0.63 under crushing load at 500 Newton per 100 millimeter. Alternatively, deformation of the ribbed and grooved optical fiber cable 100 may vary. In addition, deformation of the ribbed and grooved optical fiber cable 100 may vary depending upon the plurality of parameters. The plurality of parameters includes but may not be limited to number of the plurality of ribs 104 and the plurality of grooves 106, width and height of the plurality of ribs 104 and the plurality of grooves 106, inside and outside diameter of the ribbed and grooved optical fiber cable 100, number of the plurality of strength members 108 in the sheath 102, and material grade of the ribbed and grooved optical fiber cable 100.

In an embodiment of the present invention, the plurality of ribs (i.e. the plurality of external ribs) 104 and the plurality of grooves (i.e. the plurality of external grooves) 106 are arranged alternately to each other on the outer surface of the sheath 102. In an example, a groove of the plurality of grooves 106 is present on both sides of each rib of the plurality of ribs 104. In another example, a rib of the plurality of ribs 104 is present on both sides of each groove of the plurality of grooves 106.

In an embodiment of the present invention, height of each of the plurality of ribs 104 is equal. Alternatively, height of each of the plurality of grooves 106 is equal. In an embodiment of the present invention, the plurality of ribs 104 and the plurality of grooves 106 may have any shape including but not limited to arc, rectangular, square, triangular, trapezoidal etc.

Figure 3:
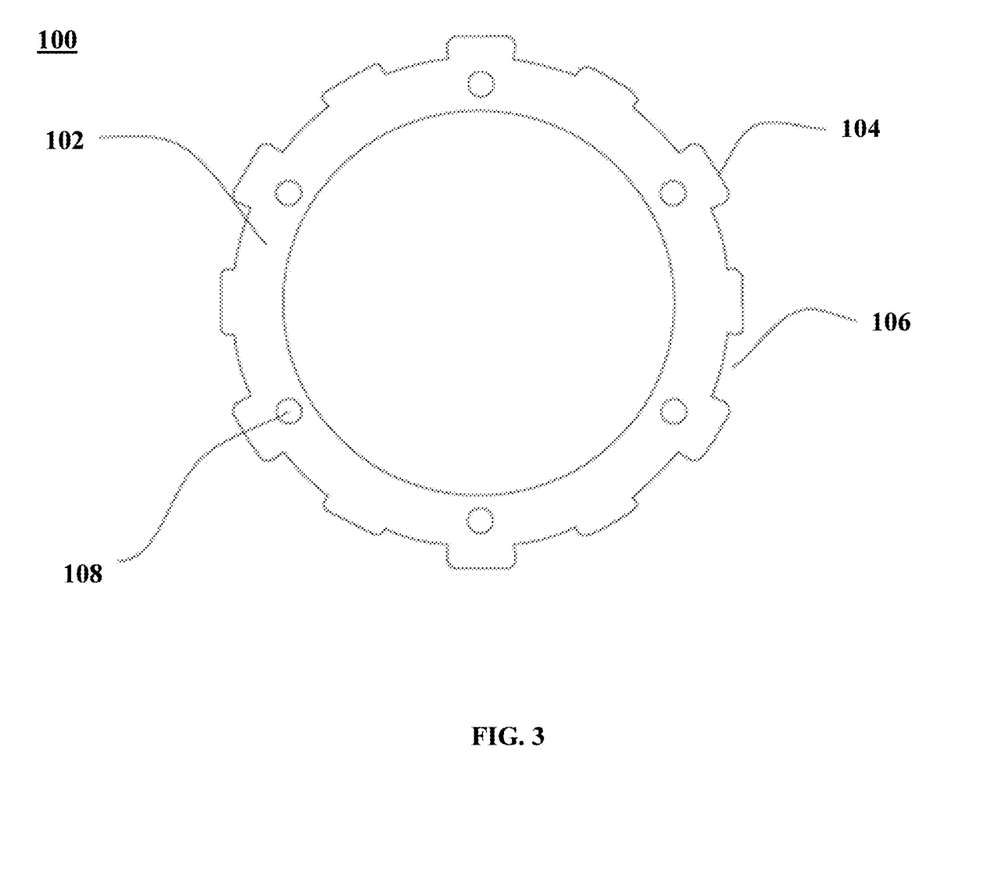
FIG. 3 illustrates the sheath with the plurality of ribs of different heights in accordance with an embodiment of the present invention.

FIG. 3 illustrates the sheath of the cable with the plurality of ribs of different heights in accordance with an embodiment of the present invention. In particular, the plurality of ribs 104 includes a first type of ribs and a second type of ribs. Each rib of the first type of ribs has a large size. Each rib of the second type of ribs has a smaller size as compared to the first type of ribs.

In an embodiment of the present invention, height of the first type of ribs (i.e. a first height) is larger than height of the second type of ribs (i.e. a second height). In an example, during installation of the ribbed and grooved optical fiber cable 100 into a duct, only the first type of ribs touches the duct. In addition, the second type of ribs does not touch the duct due to the small size of the second type of ribs.

In an embodiment of the present invention, the number of the first type of ribs is equal to the number of the second type of ribs. Particularly, the first type of ribs and the second type of ribs are arranged alternately to each other. The alternate arrangement of the first type of ribs and the second type of ribs reduces weight of the ribbed and grooved optical fiber cable 100. Moreover, the alternate arrangement of the first type of ribs and the second type of ribs reduces friction in the ribbed and grooved optical fiber cable 100.

In an embodiment of the present invention, the number of the first type of ribs is 6. In another embodiment of the present invention, the number of the first type of ribs may vary. In an embodiment of the present invention, the number of the second type of ribs is 6. In another embodiment of the present invention, the number of the second type of ribs may vary. In an embodiment of the present invention, the plurality of ribs 104 (first type of ribs and second type of ribs) is 12. In another embodiment of the present invention, the number of the plurality of ribs 104 may vary.

In an embodiment of the present invention, the area of the ribbed and grooved optical fiber cable 100 corresponding to 12 ribs is about 43.66 millimeter square. Particularly, the area of the ribbed and grooved optical fiber cable 100 may vary depending upon internal diameter of the cable, external diameter of the cable, number of the plurality of ribs 104.

In an embodiment of the present invention, the ribbed and grooved optical fiber cable 100 has deformation of about 0.59 under crushing load at 500 Newton per 100 millimeter. In another embodiment of the present invention, deformation of the ribbed and grooved optical fiber cable 100 may vary.

In addition, deformation of the ribbed and grooved optical fiber cable 100 may vary depending upon the plurality of parameters. The plurality of parameters includes but may not be limited to number of the plurality of ribs 104 and the plurality of grooves 106, width and height of the plurality of ribs 104 and the plurality of grooves 106, inside and outside diameter of the ribbed and grooved optical fiber cable 100, number of the plurality of strength members 108 in the sheath 102, and material grade of the ribbed and grooved optical fiber cable 100.

Figure 4:
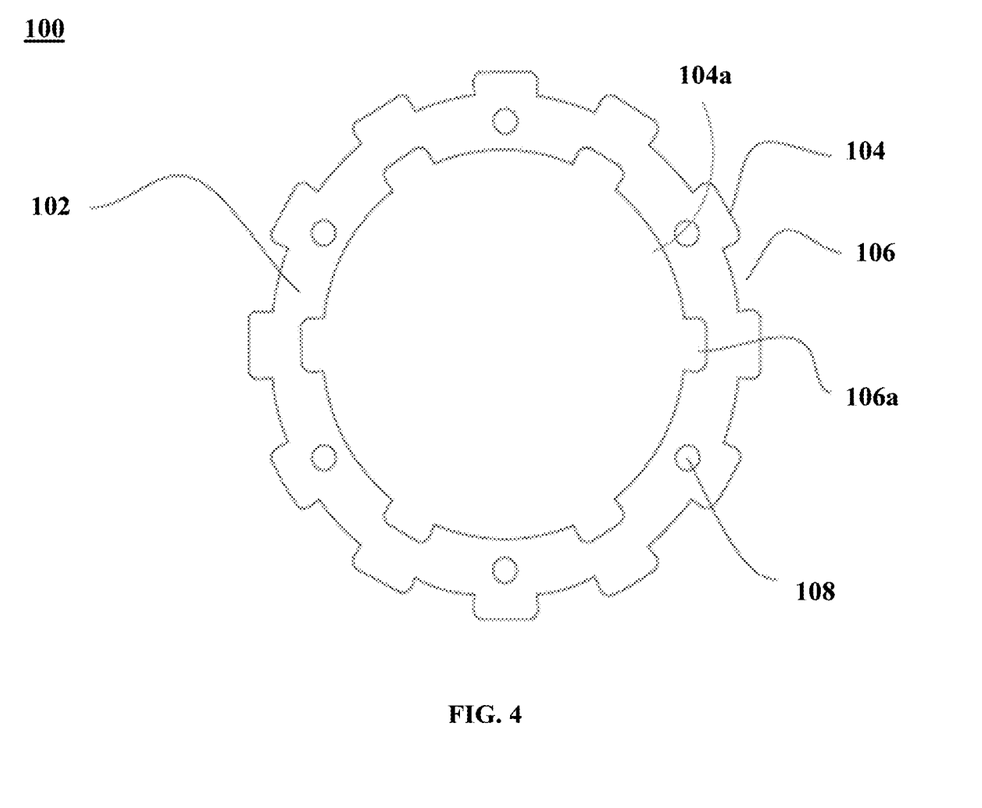
FIG. 4 illustrates the sheath having a plurality of internal grooves, a plurality of external grooves, a plurality of internal ribs and a plurality of external ribs in accordance with an embodiment of the present invention.

FIG. 4 illustrates the sheath of the cable having a plurality of internal grooves, a plurality of external grooves, a plurality of internal ribs and a plurality of external ribs in accordance with an embodiment of the present invention. The sheath 102 has the plurality of ribs 104, the plurality of grooves 106, and the plurality of strength members 108. The plurality of ribs 104 is formed on the outer surface of the sheath 102 and may be referred to as the plurality of external ribs. Further, the sheath 102 includes a plurality of internal ribs 104a and a plurality of internal grooves 106a formed on an internal surface of the sheath 102.

In an implementation, the number of the plurality of ribs 104 on the outer surface of the sheath 102 of the ribbed and grooved optical fiber cable 100 is 12. Alternatively, the number of the plurality of ribs 104 on the outer surface of the sheath 102 of the ribbed and grooved optical fiber cable 100 may vary. Each of the plurality of ribs 104 has height of about 0.5 millimeter. Alternatively, height of the plurality of ribs 104 may vary.

The sheath 102 includes the plurality of grooves 106, and the plurality of grooves 106 is also called the plurality of external grooves. Further, the sheath 102 includes a plurality of internal grooves 106a formed on an inner/internal surface of the sheath 102. The plurality of internal grooves 106a reduces the mass of the ribbed and grooved optical fiber cable 100. In addition, the plurality of internal grooves 106a increases free space for optical fibers or ribbons in the ribbed and grooved optical fiber cable 100. The plurality of external grooves 106 is formed on the outer surface of the sheath 102.

In an implementation, the plurality of internal grooves 106a on the inner surface of the sheath 102 is 6. Alternatively, the plurality of internal grooves 106a on the inner surface of the sheath 102 may vary. The plurality of internal grooves 106a has a depth of about 0.5 millimeter. Alternatively, the depth of the plurality of internal grooves 106a may vary. In an implementation, the plurality of external grooves 106 on the outer surface of the sheath 102 is 12. Alternatively, the plurality of external grooves 106 on the outer of the sheath 102 may vary.

Further, the area of the ribbed and grooved optical fiber cable 100 corresponding to 12 external ribs and 6 internal grooves is about 41.05 millimeter square. Alternatively, area of the cable may vary depending upon internal diameter of the cable, external diameter of the cable, number of the plurality of ribs 104. The ribbed and grooved optical fiber cable 100 has deformation of about 1.80 millimeter under crushing load at 500 Newton per 100 millimeter. Alternatively, deformation of the ribbed and grooved optical fiber cable 100 may vary. In addition, deformation of the ribbed and grooved optical fiber cable 100 may vary depending upon the plurality of parameters. The plurality of parameters includes but may not be limited to number of the plurality of ribs 104 and number of the plurality of internal grooves 106a and the plurality of external grooves 106, width and height of the plurality of ribs 104 and the plurality of grooves 106, inside and outside diameter of the ribbed and grooved optical fiber cable 100, number of the plurality of strength members 108 in the sheath 102, and material grade of the ribbed and grooved optical fiber cable 100.

Figure 5:
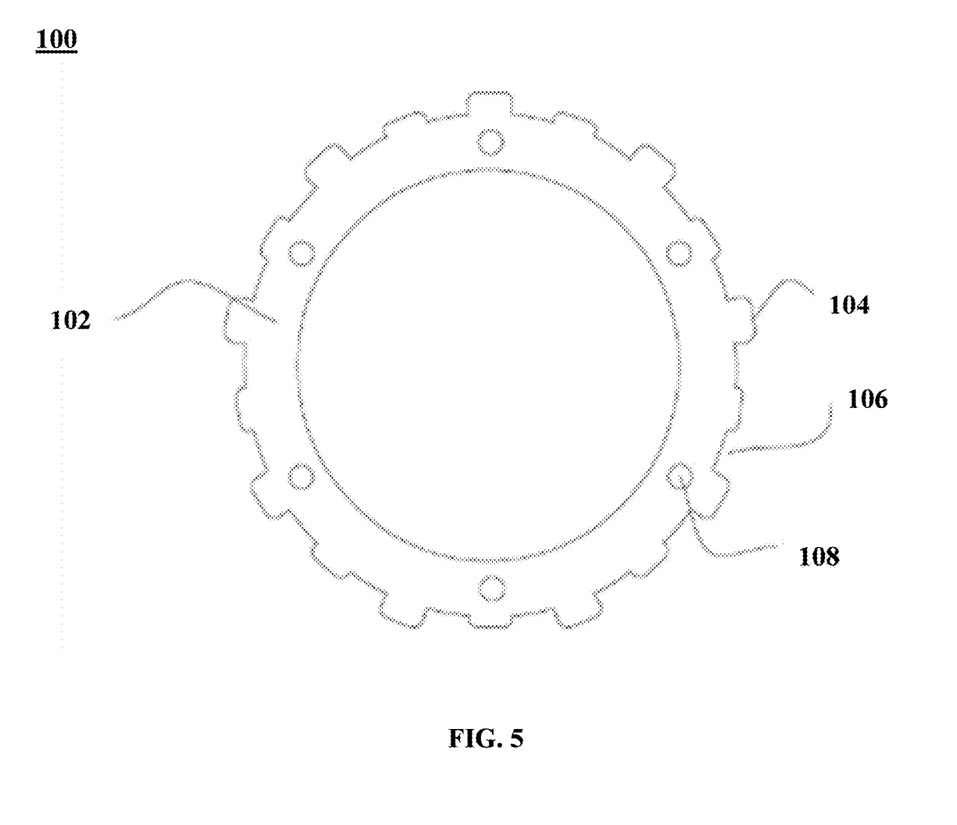
FIG. 5 illustrates the sheath having embedded strength members in accordance with an embodiment of the present invention.

FIG. 5 illustrates the sheath of the cable having embedded strength members in accordance with an embodiment of the present invention. In particular, the plurality of ribs 104 includes a first type of ribs and a second type of ribs. Each rib of the first type of ribs has a large size. Each rib of the second type of ribs has a smaller size as compared to the first type of ribs. Further, height of the first type of ribs (i.e. the first height) is larger than height of the second type of ribs (i.e. the second height).

In an implementation, the number of the first type of ribs is equal to the number of the second type of ribs. The first type of ribs and the second type of ribs are arranged alternately to each other. The alternate arrangement of the first type of ribs and the second type of ribs reduce weight of the ribbed and grooved optical fiber cable 100. In particular, the alternate arrangement of the first type of ribs and the second type of ribs reduces friction in the ribbed and grooved optical fiber cable 100. In an example, the number of the first type of ribs is 9. Alternatively, the number of the first type of ribs may vary. Further, the number of the second type of ribs is 9. Alternatively, the number of the second type of ribs may vary.

In an embodiment of the present invention, the plurality of ribs 104 (first type of ribs and second type of ribs) is 18. Alternatively, the plurality of ribs 104 may vary. Further, the plurality of grooves 106 in the ribbed and grooved optical fiber cable 100 is 18. Alternatively, the plurality of grooves 106 may vary.

In an embodiment of the present invention, the area of the ribbed and grooved optical fiber cable 100 corresponding to 18 ribs is about 42.17 millimeter square. Alternatively, area of the ribbed and grooved optical fiber cable 100 may vary depending upon internal diameter of the cable, external diameter of the cable, number of the plurality of ribs 104. The ribbed and grooved optical fiber cable 100 has deformation of about 0.45 millimeter under crushing load at 500 Newton per 100 millimeter. Alternatively, deformation of the ribbed and grooved optical fiber cable 100 may vary.

In particular, deformation of the ribbed and grooved optical fiber cable 100 may vary depending upon the plurality of parameters. The plurality of parameters includes but may not be limited to number of the plurality of ribs 104 and number of grooves of the plurality of grooves 106, width and height of the plurality of ribs 104 and the plurality of grooves 106, inside and outside diameter of the ribbed and grooved optical fiber cable 100, number of the plurality of strength members 108 in the sheath 102, and material grade of the ribbed and grooved optical fiber cable 100.

The plurality of ribs 104 and the plurality of grooves 106 of the ribbed and grooved optical fiber cable 100 (of FIG. 5) are arranged alternately to each other on the outer surface of the sheath 102. In an example, height of the first type of ribs of the ribbed and grooved optical fiber cable 100 i.e. the first height is 0.5 millimeter. In particular, the height of the second type of ribs of the ribbed and grooved optical fiber cable 100 i.e. the second height is 0.25 millimeter. In another example, height of the first type of ribs (i.e. the first height) of the ribbed and grooved optical fiber cable 100 may vary. In addition, height of the second type of ribs (i.e. the second height) of the ribbed and grooved optical fiber cable 100 may vary.

The alternate arrangement of the first type of ribs and the second type of ribs enables high crushing performance. In addition, the first type of ribs support the second type of ribs when a fixed crush load is applied on the ribbed and grooved optical fiber cable 100 that enables high crushing performance as compared to the similar design of cable where all the ribs have equal height. Further, the number of the first type of ribs and the second type of ribs is an odd number. Furthermore, the odd number of the first type of ribs and the second type of ribs ensures that each of the first type of ribs is diametrically opposite to the corresponding rib of the second type of ribs. Moreover, the odd number of the first type of ribs and the second type of ribs eliminates dependency on orientation of the fixed crush load on the ribbed and grooved optical fiber cable 100. In an example, the sheath 102 having more number of the first type of ribs (large sized ribs) has small lateral deformations. Adjacent ribs provide support to the cross section of the ribbed and grooved optical fiber cable 100 when the cable starts to deform and take an elliptical shape. In another example, the sheath 102 has less plurality of ribs 104. The plurality of ribs 104 are more spaced out in the sheath 102 due to less number of plurality of ribs 104. In addition, the sheath 102 with less plurality of ribs 104 does not provide support to cross section of the ribbed and grooved optical fiber cable 100 even at low forces.

Figure 6:
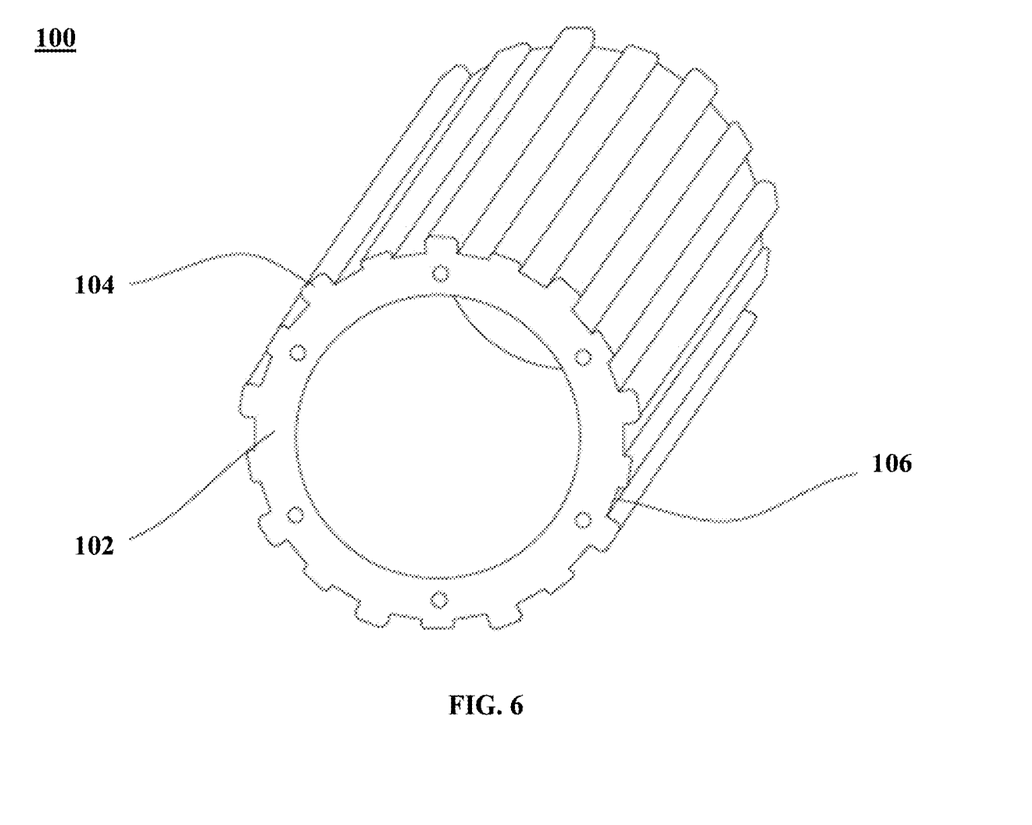
FIG. 6 illustrates the sheath having the plurality of grooves and the plurality of ribs extruded in a linear manner along a length of the cable in accordance with an embodiment of the present invention.

FIG. 6 illustrates the sheath of the cable having the plurality of grooves and the plurality of ribs extruded in a linear manner along a length of the cable in accordance with an embodiment of the present invention. Particularly, the plurality of ribs 104 and the plurality of grooves 106 are extruded longitudinally along the length of the ribbed and grooved optical fiber cable 100.

Figure 7:
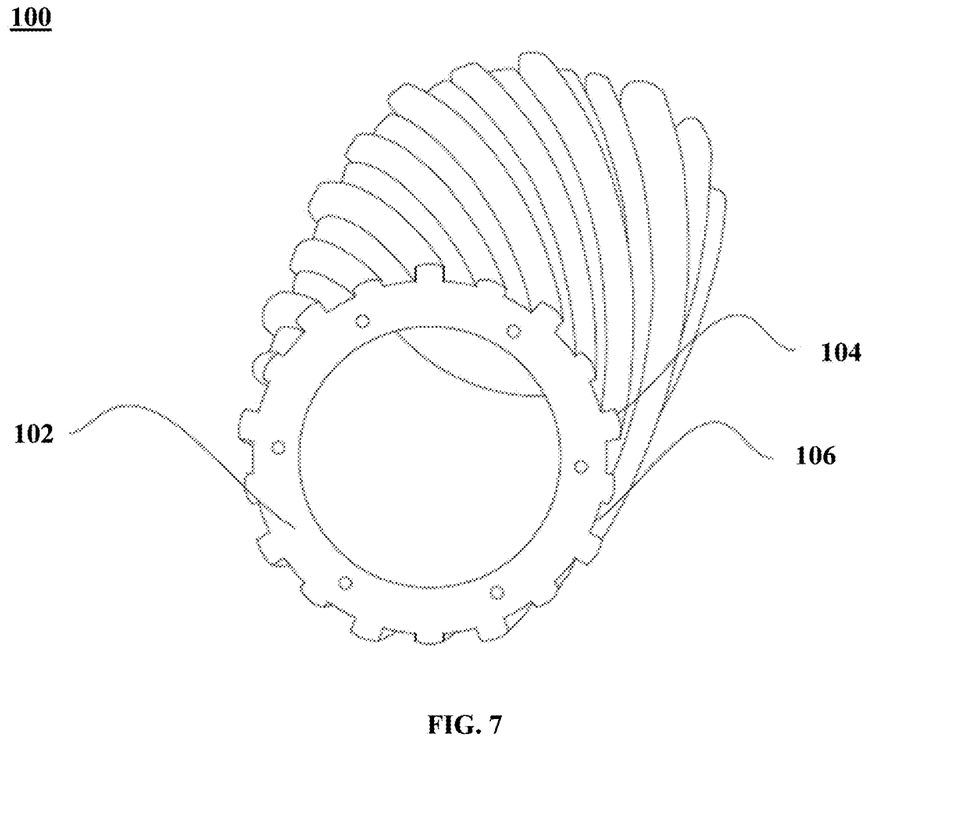
FIG. 7 illustrates the sheath having the plurality of grooves and the plurality of ribs extruded helically along the length of the cable in accordance with an embodiment of the present invention.

FIG. 7 illustrates the sheath of the cable having the plurality of grooves and the plurality of ribs extruded helically along the length of the cable in accordance with an embodiment of the present invention. Particularly, the plurality of ribs 104 and the plurality of grooves 106 are extruded helically along the length of the ribbed and grooved optical fiber cable 100. Alternatively, the plurality of ribs 104 and the plurality of grooves 106 are extruded in SZ fashion. Alternatively, the plurality of ribs 104 and the plurality of grooves 106 may be extruded in any suitable shape.

Figure 8:
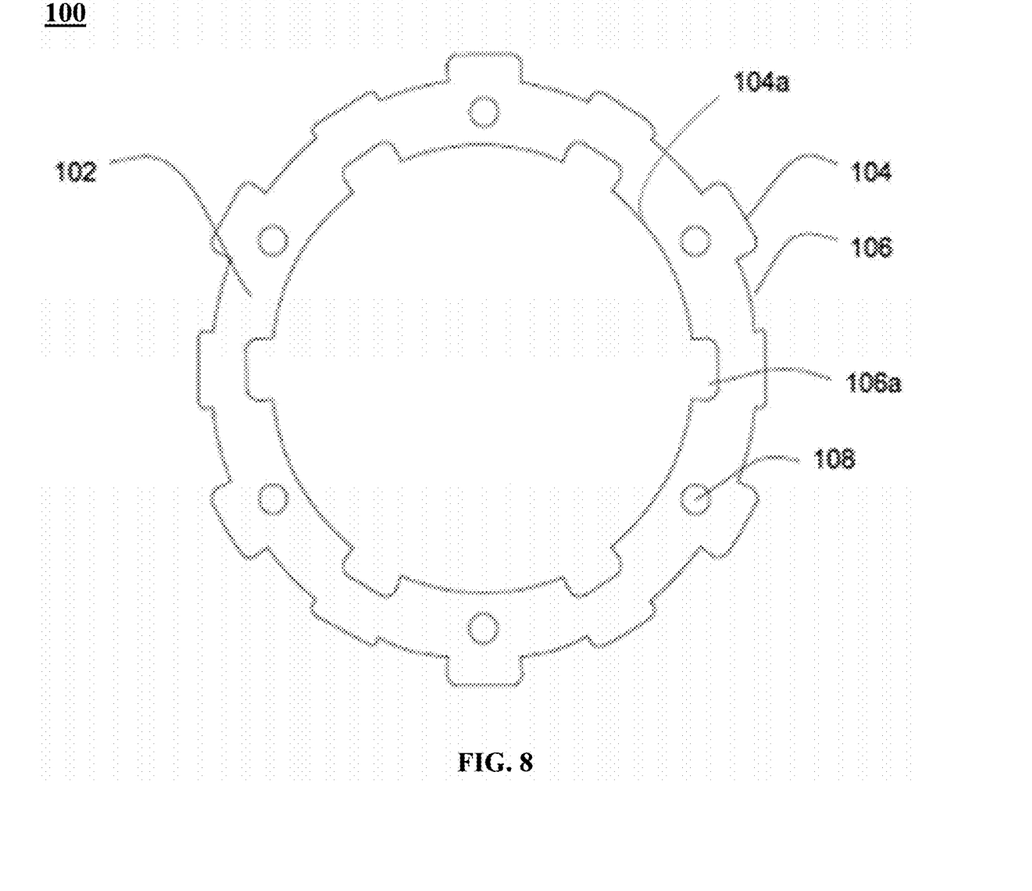
FIG. 8 illustrates the sheath having the plurality of internal grooves, the plurality of external grooves, the plurality of internal ribs and the plurality of external ribs in accordance with an embodiment of the present invention.

FIG. 8 illustrates the sheath of the cable having the plurality of internal grooves, the plurality of external grooves, the plurality of internal ribs and the plurality of external ribs in accordance with an embodiment of the present invention. The sheath 102 includes the plurality of ribs 104 on the external surface of the sheath (referred to as the plurality of external ribs 104 with reference to FIG. 8), the plurality of grooves 106 on the external surface of the sheath (referred to as the plurality of external grooves 106 with reference to FIG. 8), the plurality of internal ribs 104a, the plurality of internal grooves 106a and the plurality of strength members 108. The plurality of ribs 104 includes the first type of ribs and the second type of ribs. Each rib of the first type of ribs has a large size. Each rib of the second type of ribs has a smaller size as compared to the first type of ribs. Further, the height of each of the first type of ribs (i.e. the first height) is larger than the height of each of the second type of ribs (i.e. the second height).

Further, the number of the first type of ribs is equal to the number of the second type of ribs. The first type of ribs and the second type of ribs are arranged alternately to each other. The alternate arrangement of the first type of ribs and the second type of ribs reduces weight of the ribbed and grooved optical fiber cable 100. In addition, the alternate arrangement of the first type of ribs and the second type of ribs reduces friction in the ribbed and grooved optical fiber cable 100. Further, the number of the first type of ribs is 6. Alternatively, the number of the first type of ribs may vary. Furthermore, the number of the second type of ribs is 6. Alternatively, the number of the second type of ribs may vary. In an implementation, the plurality of ribs 104 (first type of ribs and second type of ribs) is 12. Alternatively, the plurality of ribs 104 may vary.

The ribbed and grooved optical fiber cable 100 includes the plurality of external grooves 106. In addition, the plurality of grooves 106a corresponds to the internal grooves. The plurality of ribs 104 surrounds the plurality of grooves 106. The plurality of grooves 106a (the internal grooves) are formed on the inner surface of the sheath 102. Further, the number of the internal grooves on the inner surface of the sheath 102 is 6. Alternatively, the number of the internal grooves on the inner surface of the sheath 102 may vary.

In the sheath with the ribs of different heights, the outer diameter up to 13 mm and a sheath thickness up to 2.5 mm, the first height may be in a range of 0.2-1.0 millimeter (mm) and the second height may be in the range of 0.1-0.5 millimeter. Preferably, the first height may be in the range of 0.1-0.5 millimeter and the second height may be in the range of 0.2-1.0 millimeter. Below the first height of 0.1 mm, the ribs will be difficult to manufacture and above the first height of 0.5 mm, the sheath may become mechanically weak. Further, the plurality of ribs 104 may have a width in the range of 0.8-6.5 millimeter. Below the width of 0.8 mm, the ribs will be mechanically weak and beyond the width of 6.5 mm, the blowing performance will be affected. Furthermore, the plurality of grooves 106 may have a width in the range of 0.8-6.5 millimeter.

The alternate arrangement of the first type of ribs and the second type of ribs enables high crushing performance. The first type of ribs support the second type of ribs when a fixed crush load is applied on the ribbed and grooved optical fiber cable 100 that enables high crushing performance as compared to the similar design of cable where all the ribs have equal height.

In an implementation, the number of the first type of ribs and the second type of ribs is an odd number. The odd number of the first type of ribs and the second type of ribs ensures that each of the first type of ribs is diametrically opposite to the corresponding rib of the second type of ribs. Moreover, the odd number of the first type of ribs and the second type of ribs eliminates dependency on orientation of the fixed crush load on the ribbed and grooved optical fiber cable 100.

Figure 9:
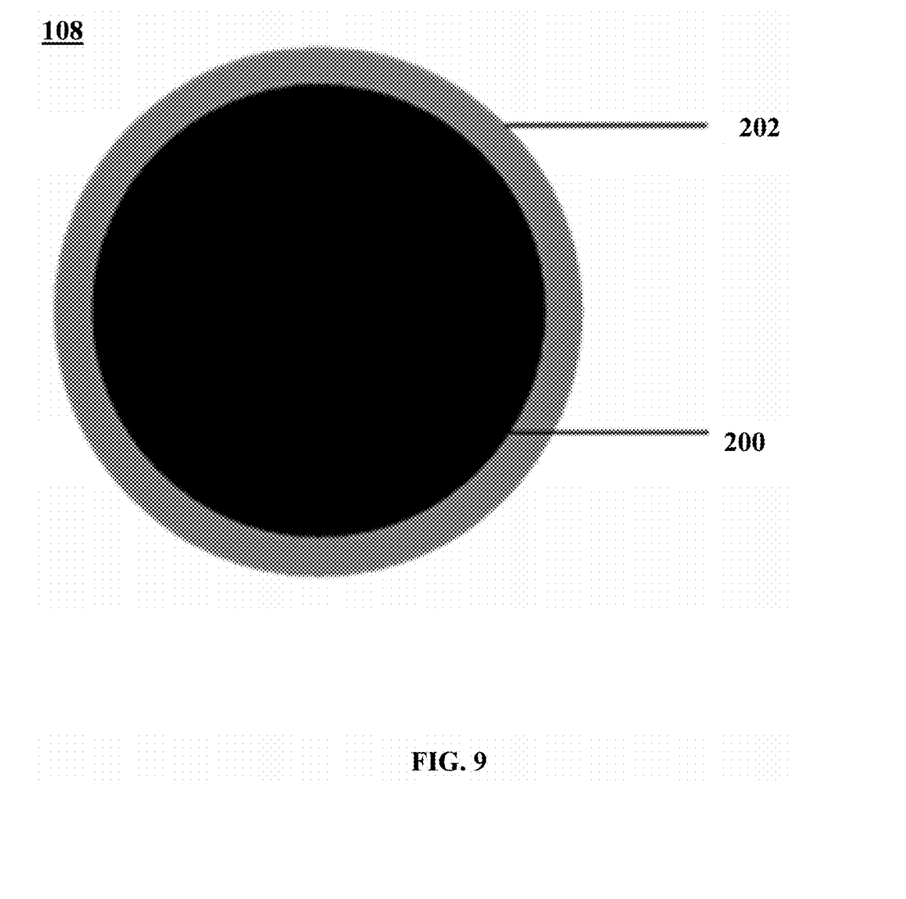
FIG. 9 illustrates the strength member of the ribbed grooved optical fiber cable coated with a coating material in accordance with an embodiment of the present invention.

FIG. 9 illustrates the strength member of the cable coated with a coating material in accordance with an embodiment of the present invention. The plurality of strength members 108 embedded in the sheath 102 may have a circular shape or any other suitable shape. The one or more strength members 108 are coated with the coating material having at least one of an ultraviolet (UV) curable water swellable resin composition (or resin) and a thick layer of ethylene acrylic acid (EAA) to prevent water ingression in the ribbed and grooved optical fiber cable 100 as without the coating material, the water may seep through the one or more strength members 108 embedded in the sheath 102.

During the coating process, the thick layer of ethylene acrylic acid (EAA) 202 may be coated on the one or more strength members 200 before embedding in the sheath 102. The ethylene acrylic acid (EAA) provides a good adhesion between the one or more strength members 108 and the sheath 102 to further prevent from water ingression.

Alternatively, the UV curable water swellable resin composition 202 is coated on the one or more strength members 200 and cured before embedding in the sheath 102. In case, the resin composition comes in contact with water, it swells and blocks the way for water to avoid penetration in the core of the ribbed and grooved optical fiber cable 100. Typically, the core includes the plurality of optical fibers. The plurality of optical fibers may be incorporated in the core as a plurality of loose tube optical fibers, a plurality of tight buffered optical fibers, a group or stack of optical fiber ribbons or the like., which is enclosed by the sheath 102. The UV curable water swellable resin composition can include, but not limited to, acrylic acid, phenyl bis(2,4,6-trimethylbenzoyl)-phosphine oxide and oxybis(methyl-2,1-ethanediyl) diacrylate.

In an implementation, the UV curable water swellable resin composition may be applied directly on the one or more strength members 108 or above a thin layer of ethylene acrylic acid (EAA) having a thickness of 25±5 microns. The thin layer of ethylene acrylic acid (EAA) helps to achieve better adhesion of the one or more strength members with material of the sheath. Once, the UV curable water swellable resin composition is applied on the one or more strength members 108, the one or more strength members 108 are passed through one or more UV chambers to cure the UV curable water swellable resin composition.

The coating 202 may have a thickness, preferably, in a range of 40 microns to 60 microns as a thinner layer of the coating material may lead to water ingression. Also, a sheathing tool has strength member embedding holes that supports the coating thickness up to 50-60 microns. Beyond this, abrasion will occur and will further lead to waste creation. Alternatively, the thickness of the coating may vary. Further, the one or more strength members 108 may be made of fiber reinforced plastic (FRP), aramid reinforced plastic (ARP) or any other suitable material.

FIGS. 1 to 8 illustrate the sheath of the cable in accordance with various embodiments of the present invention. The sheath 102 has the plurality of ribs 104, the plurality of grooves 106 and the plurality of strength members 108. The sheath 102 encloses the plurality of optical fibers. The plurality of grooves 106 on the outer surface of the sheath 102 may be called as the plurality of external grooves. The plurality of grooves 106 on the inner surface of the sheath 102 may be called as the plurality of internal grooves. Similarly, the plurality of ribs 104 on the outer surface of the sheath 102 may be called as the plurality of external ribs or external ribs. The plurality of ribs 104a on the inner surface of the sheath 102 may be called as the plurality of internal ribs or internal ribs.

The plurality of ribs 104 includes a first type of ribs and a second type of ribs. Each rib of the first type of ribs may have a larger size than each rib of the second type of ribs. Alternatively, each rib of the first type of ribs may have smaller size than each rib of the second type of ribs. The ribbed and grooved optical fiber cable 100 having the plurality of ribs 104 may have at least two heights. The first type of ribs may have the first height and the second type of ribs may have the second height. The first type of ribs may have a larger height than of the second type of ribs. Alternatively, the first type of ribs may have smaller height than of the second type of ribs. Alternatively, the first type of ribs and the second type of ribs may have the same size and height.

The plurality of ribs 104 and the plurality of grooves 106 of the ribbed and grooved optical fiber cable 100 are arranged alternately to each other on the outer surface of the sheath 102. The height (i.e. the first height) of the first type of ribs and the height (i.e. the second height) of the second type of ribs of the ribbed and grooved optical fiber cable 100 may vary. Further, height of each of the plurality of grooves 106 is equal. Alternatively, height of each of the plurality of grooves 106 may vary. In an example, the sheath 102 having more number of the first type of ribs (large sized ribs) has small lateral deformations. Adjacent ribs provide support to the cross section of the ribbed and grooved optical fiber cable 100 when the cable starts to deform and take an elliptical shape. In another example, the sheath 102 has less plurality of ribs 104. The plurality of ribs 104 are more spaced out in the sheath 102 due to less number of plurality of ribs 104. In addition, the sheath 102 with less plurality of ribs 104 does not provide support to the cross section of the ribbed and grooved optical fiber cable 100 even at low forces.

Figure 10:
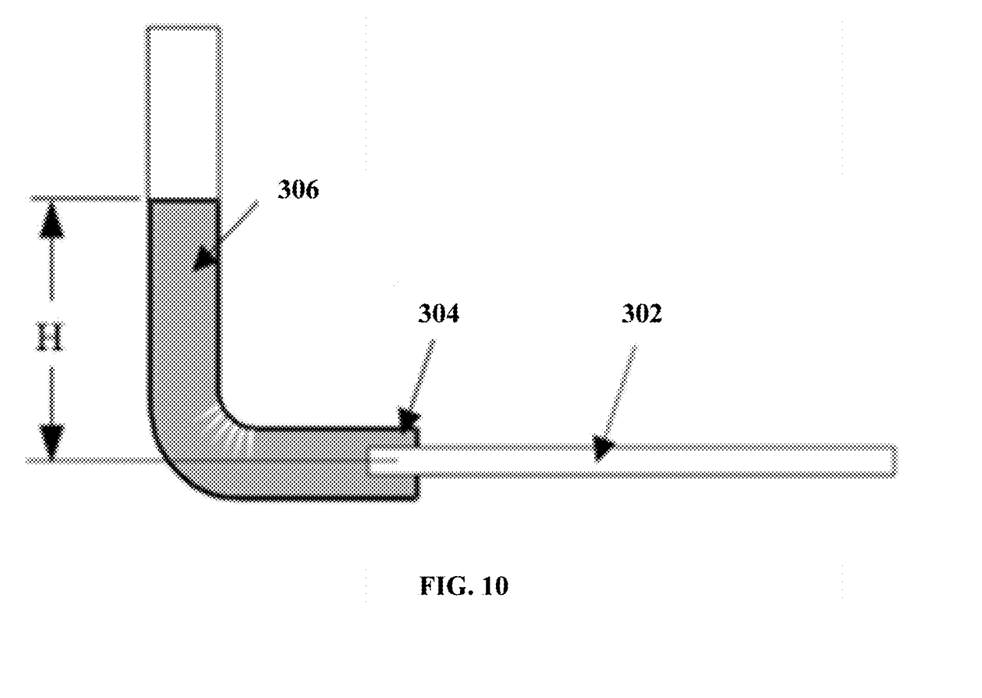
FIG. 10 illustrates a water penetration test arrangement for the ribbed grooved optical fiber cable in accordance with an embodiment of the present invention.

FIG. 10 illustrates a water penetration test arrangement for the cable in accordance with an embodiment of the present invention. Once the plurality of strength members 108 are embedded in the sheath 102, the ribbed and grooved optical fiber cable 100 may pass water penetration test. In the water penetration test, 0.1 bar pressure water-head was applied to a 3 m cable sample kept for at least 24 hours.

In another test, the sample was pre-soaked in a bucket of water to a depth of 100 mm±10 mm for 10 min before the test. In yet another test, the cable sample 302 of 3 meters was taken and a watertight seal 304 was applied to allow a 1 m (H) of water-head 306 to be applied for 24 hours.

Referring to FIGS. 1 through 10, the sheath 102 and the plurality of external ribs 104 may be made of same material such as polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene, thermoset polyolefins or combination thereof. Alternatively, the sheath 102 and the plurality of external ribs 104 may be made of different materials. The plurality of external ribs 104 and the plurality of external grooves 106 are one or more of a rectangular shape with rounded edges, a pointy triangle shape, a circular shape, a curve-type shape or other suitable shape. Further, the plurality of external ribs 104 has a height (first height or second height or both) in a range of 0.1-2.0 millimeters, the plurality of external ribs 104 has a width in a range of 0.4-20 millimeters and the plurality of external grooves 106 has a width in a range of 0.4-20 millimeters. Furthermore, the optical fiber ribbed and grooved optical fiber cable 100 has a diameter in a range of 11 to 13 millimeters, and the optical fiber cable has a blowing of more than 1100 meters in the duct with an inner diameter of 14 millimeters and an outer diameter of 18 millimeters. The plurality of internal ribs have the height in the range of 0.1-1.0 millimeter and the width in the range of 1.2-2.5 millimeters. Further, the plurality of internal grooves have the width in the range of 1.2-2.5 millimeters.

The ribbed and grooved cable that reduces coefficient of friction between a cable sheath and a duct. Moreover, the ribbed and grooved cable has embedded strength member(s) in the cable sheath with a water blocking coating to provide mechanical strength and ease of blowing to the ribbed and grooved cable and to prevent water ingression inside the ribbed and grooved cable. Further, the inner grooves reduce mass of the ribbed and grooved cable while increasing free space for optical fibers or ribbons in the ribbed and grooved cable.

The present invention provides advantages such as a high blowing performance, reduced mass of the cable, increased free space for optical fibers or ribbons in the cable, large and irregular surface area, increased drag force, reduced coefficient of friction between the sheath and the duct, and better crushing behaviour.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments. It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims. It is to be understood that the terms so used are interchangeable under appropriate circumstances and embodiments of the invention are capable of operating according to the present invention in other sequences, or in orientations different from the one(s) described or illustrated above.

What is claimed for:

1. A ribbed and grooved fiber cable (100) comprising:
a core with a plurality of optical fibers;
a sheath (102) enveloping the core; and the sheath (102) has an outer surface and an inner surface, wherein the outer surface of the sheath (102) has a plurality of external ribs (104) and a plurality of external grooves (106), wherein the sheath (102) and the plurality of external ribs (104) are made of different materials; and
at least one of one or more strength members (108) embedded in the sheath (102), a plurality of ribs (104) and grooves (106) on an external surface of the sheath (102), and a plurality of ribs (104a) and grooves (106a) on an internal surface of the sheath (102), wherein the plurality of ribs (104) have variable height, wherein the one or more strength members (108) are coated with a water blocking coating material having at least one of an ultraviolet (UV) curable water swellable resin composition and a layer of ethylene acrylic acid (EAA).

2. The ribbed and grooved optical fiber cable (100) as claimed in claim 1, wherein the plurality of external ribs (104) are arranged alternately throughout the outer surface of the sheath (102) of the optical fiber cable (100).

3. The ribbed and grooved optical fiber cable (100) as claimed in claim 1, wherein the plurality of external ribs (104) have at least two heights and the least two heights includes a first height and a second height.

4. The ribbed and grooved optical fiber cable (100) as claimed in claim 3, wherein the plurality of external ribs (104) having the first height and the second height are arranged in such a way that the plurality of external ribs (104) having the first height and the plurality of external ribs (104) having the second height are positioned diagonally opposite to each other.

5. The ribbed and grooved optical fiber cable (100) as claimed in claim 3, wherein the first height is in a range of 0.2 millimeters to 10 millimeters and the second height is in a range of 0.1 millimeters to 0.5 millimeters.

6. The ribbed and grooved optical fiber cable (100) as claimed in claim 1, wherein the plurality of external ribs (104) and the plurality of external grooves (106) has a width in a range of 1.2 millimeters to 2.5 millimeters.

7. The ribbed and grooved optical fiber cable (100) as claimed in claim 1, wherein a shape of the plurality of external ribs (104) and the plurality of external grooves (106) is anyone of a rectangular shape with rounded edges, a pointy triangle shape, a circular shape, or a curve-type shape.

8. The ribbed and grooved optical fiber cable (100) as claimed in claim 1, wherein the sheath (102) and the plurality of external ribs (104) are made of a same material selected from polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene, thermoset polyolefins or combination thereof.

9. The ribbed and grooved optical fiber cable (100) as claimed in claim 1, wherein the different materials for the sheath (102) and the plurality of external ribs (104) are selected from polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene, thermoset polyolefins or combination thereof.

10. The ribbed and grooved optical fiber cable (100) as claimed in claim 1, wherein the ribbed and grooved optical fiber cable (100) has a diameter in a range of 11 millimeters to 13 millimeters and a blowing of more than 1100 meters in a duct with an inner diameter of 14 millimeters and an outer diameter of 18 millimeters.

11. The ribbed and grooved optical fiber cable (100) as claimed in claim 1, wherein the plurality of internal ribs (104a) and the plurality of internal grooves (106a) are arranged alternately throughout the inner surface of the sheath (102).

12. The ribbed and grooved optical fiber cable (100) as claimed in claim 11, wherein a shape of the plurality of internal ribs (104a) and the plurality of internal grooves (106a) has anyone of a rectangular shape with rounded edges, a pointy triangle shape, a circular shape, or a curve-type shape.

13. The ribbed and grooved optical fiber cable (100) as claimed in claim 11, wherein the plurality of internal ribs (104a) has a height in a range of 0.1 millimeter to 1.0 millimeter.

14. The ribbed and grooved optical fiber cable (100) as claimed in claim 11, wherein the plurality of internal ribs (104a) and the plurality of internal grooves (106a) has a width in a range of 1.2 millimeter to 2.5 millimeters.

15. The ribbed and grooved optical fiber cable (100) as claimed in claim 1, wherein the UV curable water swellable resin composition includes acrylic acid, phenyl bis(2,4,6-trimethylbenzoyl)-phosphine oxide and oxybis(methyl-2,1-ethanediyl) diacrylate.

16. The ribbed and grooved optical fiber cable (100) as claimed in claim 15, wherein the UV curable water swellable resin composition is applied directly on the one or more strength members (108) or above the layer of ethylene acrylic acid (EAA).

17. The ribbed and grooved optical fiber cable (100) as claimed in claim 15, wherein the UV curable water swellable resin composition coated one or more strength members (108) are passed through one or more UV chambers to cure the UV curable water swellable resin composition.

18. The ribbed and grooved optical fiber cable (100) as claimed in claim 1, wherein the water blocking coating material applied over the one or more strength members (108) has a thickness of 50±10 microns.

19. The ribbed and grooved optical fiber cable (100) as claimed in claim 1, wherein the ribbed and grooved optical fiber cable (100) passes a water penetration test at 0.1 bar pressure water-head applied to a 3 meter optical cable for at least 24 hours.

20. The ribbed and grooved optical fiber cable (100) as claimed in claim 1, wherein the one or more strength members (108) are made of a fiber reinforced plastic (FRP), or an aramid reinforced plastic (ARP).

* * * * *